United States Patent [19]
Reid et al.

[11] Patent Number: 5,293,777
[45] Date of Patent: Mar. 15, 1994

[54] HINGED ASSEMBLY FOR AIR BRAKE VALVE TEST FIXTURE

[75] Inventors: Jeffrey D. Reid, Vineland; W. Thomas Digweed, Beamsville, both of Canada

[73] Assignee: Westinghouse air Brake Company, Wilmerding, Pa.

[21] Appl. No.: 964,178

[22] Filed: Oct. 21, 1992

[51] Int. Cl.⁵ .......................................... G01M 19/00
[52] U.S. Cl. ................................................. 73/121
[58] Field of Search ........................ 73/168, 121, 39

[56] References Cited

U.S. PATENT DOCUMENTS

| | | |
|---|---|---|
| 2,103,305 | 12/1937 | Thomas . |
| 3,169,391 | 2/1965 | Spalding ................................. 73/39 |
| 3,596,500 | 8/1971 | Rees ....................................... 73/39 |
| 3,727,453 | 4/1973 | Rees ....................................... 73/39 |

FOREIGN PATENT DOCUMENTS 436990 12/1974 U.S.S.R. ................................. 73/168

*Primary Examiner*—Jerry W. Myracle
*Attorney, Agent, or Firm*—Gary J. Falce

[57] ABSTRACT

A hinge assembly for a manual or automatic air brake valve test fixture that includes a secondary test plate to which a valve device to be tested is mounted from a front load position and then rotated to its usual side location for clamping to the primary test plate, thereby relieving the tester of physical strain encountered heretofore in mounting the valve in a side load position. The hinge assembly is spring-loaded to obtain even, face-to-face engagement of the mating surfaces of the primary and secondary test plates and thereby assure the integrity of the pressure seal therebetween.

12 Claims, 4 Drawing Sheets

HINGED ASSEMBLY FOR AIR BRAKE VALVE TEST FIXTURE

BACKGROUND OF THE INVENTION

This invention relates to apparatus for testing railway car brake equipment and particularly to a valve mounting arrangement for such a brake valve test apparatus.

Brake control valve test devices, such as the manual "AB" Test Rack shown and described in WABCO Instruction Pamphlet No 5039-19 Sup. 1, issued April 1991, and published by the Westinghouse Air Brake Co., Wilmerding, Pa. are provided to test service and emergency portions of various vintage brake control valves, as well as other railroad braking devices according to test codes adopted by the Association of American Railroads. The test procedure is complex in that an array of manually operable control valves must be manipulated in a prescribed sequence, combined with monitoring of pressure gages and timers.

More recently, automated type test devices have been introduced, such as that shown in U.S. Pat. No. 3,596,500 which not only removes the need for highly trained personnel, but also eliminates human error in carrying out the required sequence of tests.

In either case, however, the test operator is required to physically mount and secure the valves on a test fixture. As can be seen in the aforementioned Patent, the valve to be tested is mounted sideways to the operator's station in front of the test fixture, thus requiring the operator to lift the valve over the test fixture and into position on the appropriate mounting studs projecting from the fixture end. Not only is this task cumbersome, but is also results in severe physical strain due to the relatively heavy weight of these valve devices.

SUMMARY OF THE INVENTION

The object of the present invention is to alleviate the physical strain associated with mounting air brake valve portions on either the manual or automated AB Test Racks.

It is a further object of the invention to achieve the foregoing by modifying the test fixture employed with existing manual and automated AB Test Racks to accommodate front mounting of the valve portions to be tested.

Yet another object of the invention is to assure flush interfacing of the valve portions to be tested relative to its appropriate test plate irrespective of such misalignment that may exist therebetween.

Briefly, these objectives are achieved by providing a test fixture for an air brake valve test rack comprising a test stand including a valve mounting manifold to which fluid under pressure is connected, a primary test plate affixed at one face thereof to the valve mounting manifold, a secondary test plate having one face connected to the other face of the primary test plate and having another face on which a valve device may be mounted for testing, and means for pivotally supporting the secondary test plate so as to provide rotation thereof between a test position in which the one face of the secondary test plate is engaged with the other face of the primary test plate and a load/unload position in which the one face of the secondary test plate is disengaged from the other face of the primary test plate.

BRIEF DESCRIPTION OF THE DRAWINGS

These and other objects and advantages of the present invention will become apparent from the following more detailed explanation of the invention when taken in conjunction with the accompanying drawings in which.

DESCRIPTION AND OPERATION

Figure 1:
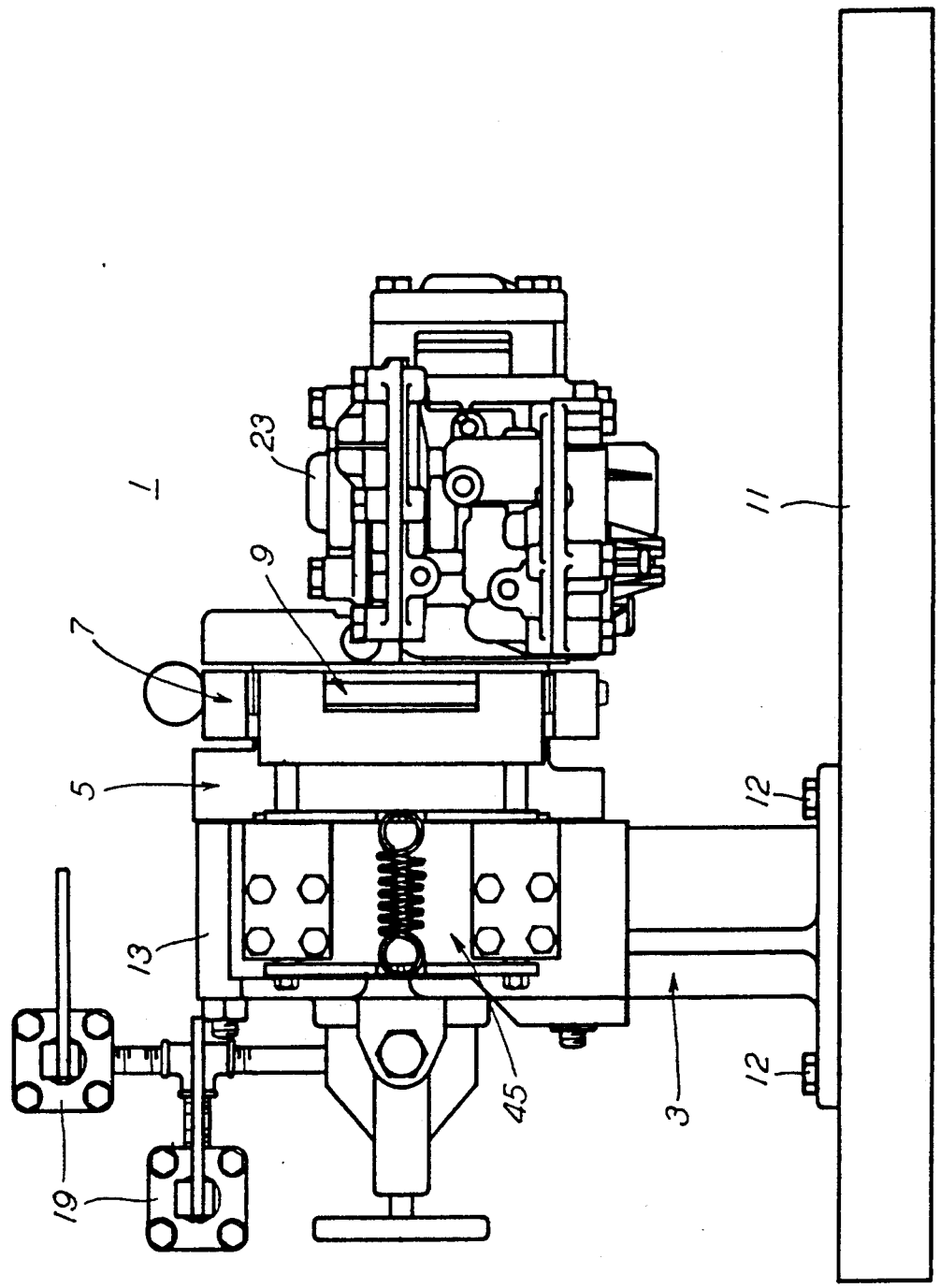
FIG. 1 is a front elevation view of a test fixture employed in an air brake valve test rack and having a valve portion mounted thereon for testing.

Referring now to FIG. 1, there is shown a test fixture 1 including a test stand 3, a primary test plate 5, a secondary test plate 7 and a hinge assembly 9. Test stand 3 is mounted on a test table 11, as by bolts 12, and includes a mounting manifold 13 to which suitable piping is connected having compressed air supplied thereto. Also connected to mounting manifold 13 is the primary test plate 5, which is provided with appropriate inlet ports (not shown) in the face 15 adjacent the manifold face 17 to which the primary plate is affixed through the intermediary of a gasket 18, these inlet ports being located to receive compressed air supplied through passages in manifold 13. Various operating valves 19 are provided to control the delivery of compressed air to mounting manifold 13. A face 21 of primary test plate 5 opposite face 15 is provided with outlet ports (not shown) located to mate with corresponding ports in an air brake valve to be tested, such as an ABD Control Valve Service portion 23.

Figure 3:
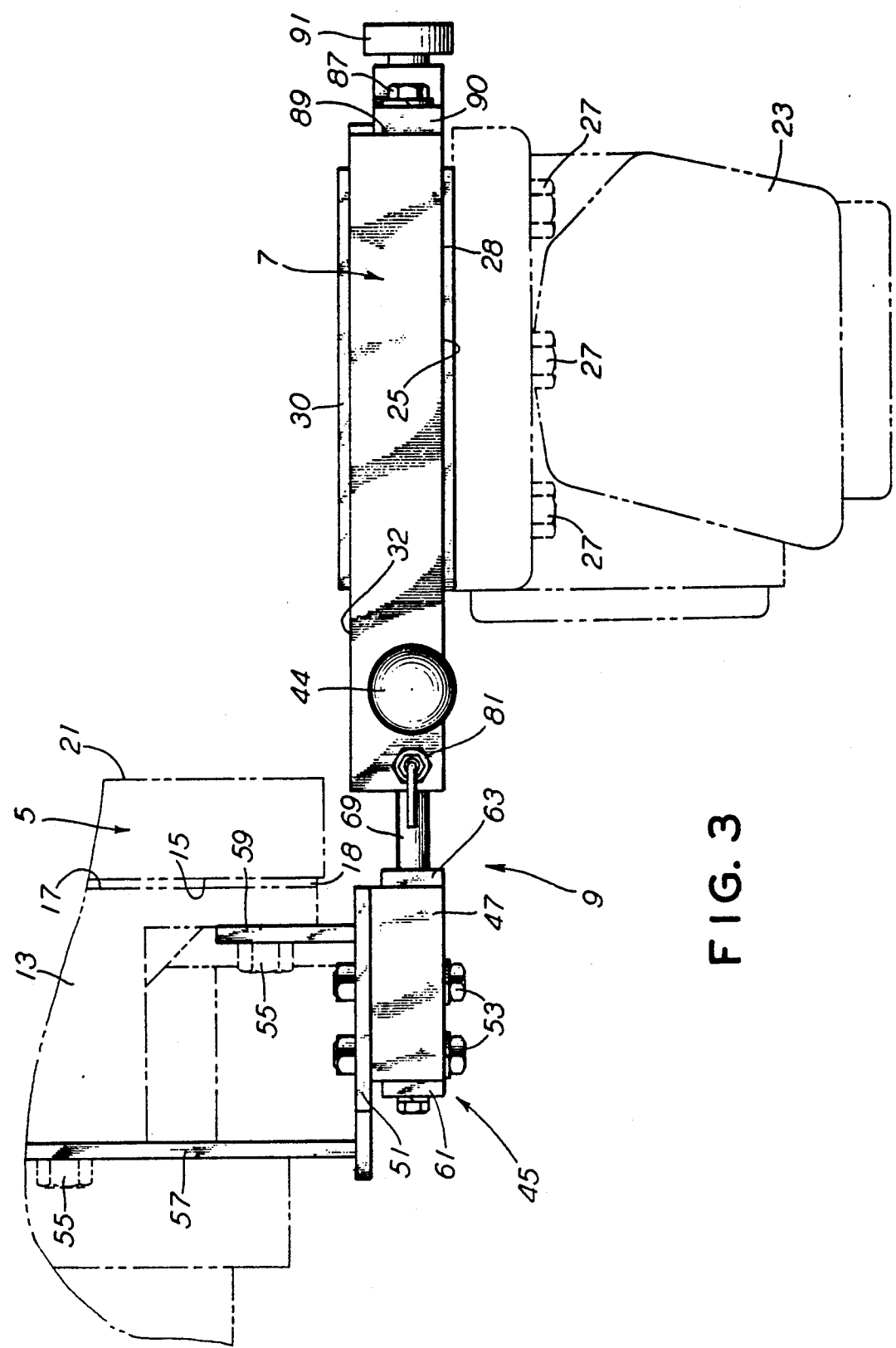
FIG. 3 is a plan view of the hinge assembly of FIG. 2 with a test valve and a test stand associated therewith shown in phantom.
Figure 4:
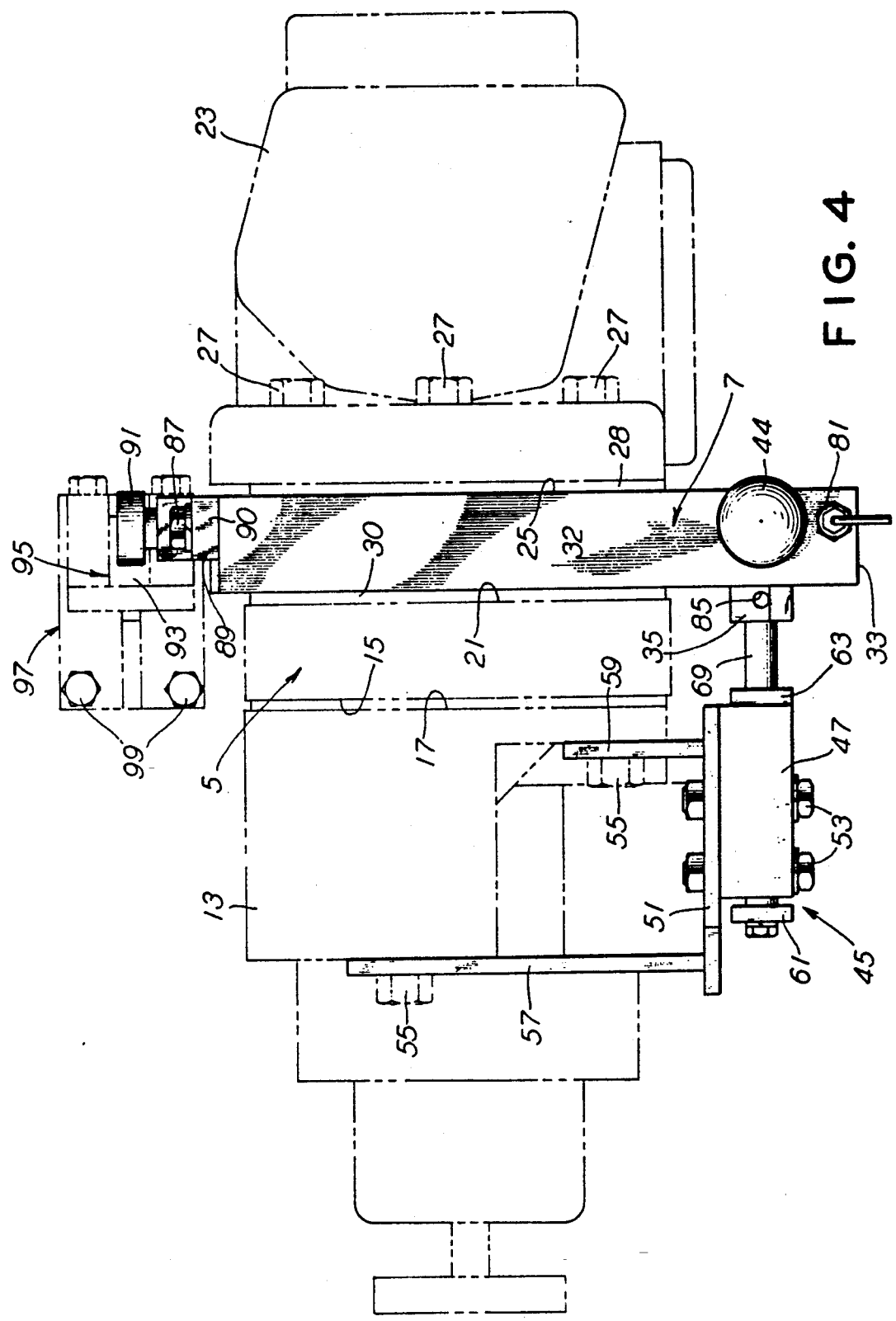
FIG. 4 is a plan view of the hinge assembly of FIG. 2 in its test position with a test valve and a test stand associated therewith shown in phantom.

In accordance with the present invention, service portion 23 is connected to primary test plate 5 by way of secondary test plate 7, which is located intermediate primary test plate 5 and service portion 23, and which is provided with a mounting face 25 having threaded openings 26 into which bolts 27 are threaded to mount service portion 23 to secondary test plate 27, through the intermediary of a gasket 28, as shown in FIG. 4. Passageways 29 (FIG. 2) are provided in secondary test plate 7 to connect the outlet ports of primary test plate 5 to the appropriate ports of service portion 23. In addition a gasket 30 is assembled on a face 32 of secondary test plate 7, as shown in FIG. 3, or alternatively the gasket may be assembled on face 21 of primary test plate 5.

The secondary or "dummy" test plate 7 is arranged with hinge assembly 9 in order to allow pivotal rotation of the secondary test plate between a load/unload position, as shown in FIG. 3 and a test position, as shown in FIG. 4. In this manner, mounting of the relatively heavy service portion 23 prior to testing and subsequent removal following completion of testing can be accomplished without excessive strain from a location in front of the tester's station, i.e., with the mounting face 25 of secondary test plate 7 facing the tester.

Figure 2:
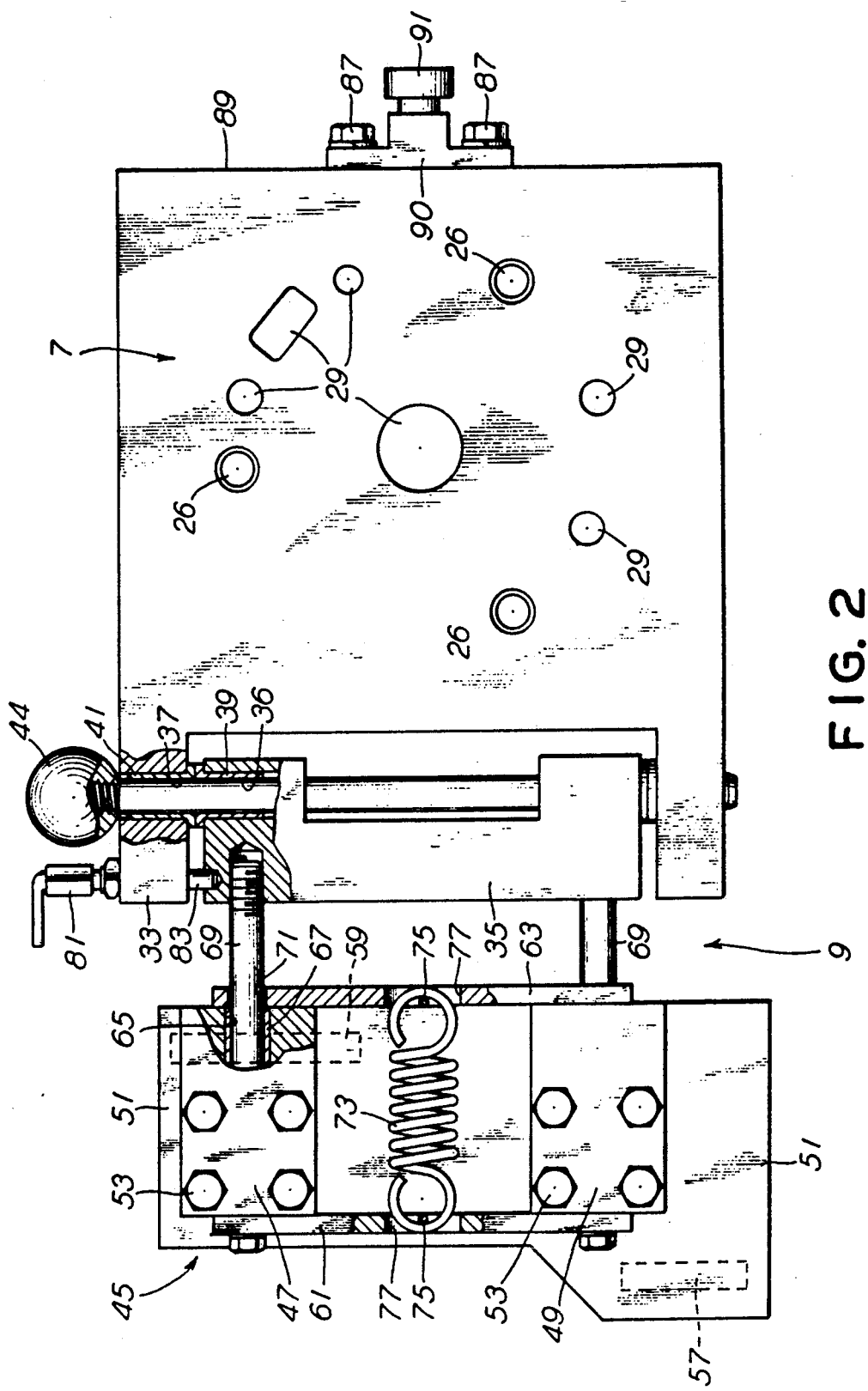
FIG. 2 is a front elevation view of the hinge assembly employed in the test fixture of FIG. 1 shown in a load-/unload position for front mounting of the valve portion to be tested.

As shown in FIG. 2, the hinge assembly 9 includes a hinge joint 31 formed by a bifurcated side 33 of secondary test plate 7 that comprises a female portion of the hinge joint, and a swivel plate 35 that is disposed within the bifurcation formed by the female portion and which comprises a male portion of the hinge joint. The male and female portions are provided with aligned openings 36, 37 having bushings 39, 41 through which a hinge pin 43 passes. A head 44 of hinge pin 43 prevents the hinge pin from falling through bushings 39, 41.

Hinge joint 31 is connected to test stand 3 through a spring assembly 45 including a pair of spaced-apart hinge plates 47, 49 that are attached to a mounting bracket 51 by bolts 53, that pass through elongated openings in bracket 51 to allow for vertical adjustment of the hinge plates. Mounting bracket 51 is, in turn, connected to test stand 3 by bolts 55, which pass through arms 57, 59 of bracket 51, these bolts serving the additional function of securing the primary test plate to test stand 3.

A first end plate 61 lies adjacent the left hand side of hinge plates 47, 49, while a second end plate 63 lies adjacent the right hand side of the hinge plates. Each hinge plate 47, 49 is provided with a bore 65 having a bushing 67 in which connecting rods 69 are slidably disposed. One end of each connecting rod 69 is connected by screw threads to swivel plate 35, while the other end of each connecting rod is connected to end plate 61, each connecting rod 69 passing through an opening 71 provided in end plate 63. An extension spring 73 is connected between end plates 61, 63 by means of a cross pin 75 within a vertical slot 77 formed in each end plate, one cross pin 75 being substantially midway between the connection of the respective connecting rods 69 with end plate 61 and the other cross pin 75 being substantially midway between the respective openings 71 in end plate 63. The force of spring 73 normally maintains engagement of end plates 61, 63 with the respective left and right hand sides of hinge plates 47, 49, thereby limiting extension of hinge joint 31 a predetermined maximum distance from spring assembly 45, as shown in FIGS. 2 and 3, for a purpose hereinafter explained.

Carried on the upper surface 79 of secondary test plate 7 is a spring-loaded plunger 81, the active end 83 of which extends through an opening in the upper branch of bifurcated side wall 33 and projects into the bifurcation under the influence of a spring (not shown). A detent opening 85 formed in the top of swivel plate 3 to receive active end 83 of plunger 81 when the secondary test plate 7 is rotated into its load/unload position, as shown in FIGS. 2 and 3, in order to lock the secondary test plate against further rotation. An inclined surface 86 is formed on the top surface of swivel plate 35 leading to opening 85, on which plunger end 83 rides as it approaches opening 85, in order to allow the plunger end 83 to enter opening 85 without significant resistance under spring load to thereby automatically lock secondary test plate 7 in its load/unload position.

Attached by bolts 87 to the outer sidewall 89 of secondary test plate 7 is a carriage 90 having a roller 91 that is adapted to engage a bearing surface provided by a flat 93 formed on an alignment bracket 95 that is adjustably fixed in a vertical position to a stanchion 97 that is mounted on the test table 11 by bolts 99. In providing vertical adjustment of alignment bracket 95, secondary test plate 7 may be aligned relative to primary test plate 5, as well as provided with end support to remove the cantilever forces from hinge joint 31.

In carrying out the testing of an air brake valve, such as service portion 23 of an ABD Control Valve, for example, the secondary test plate 7 is swung to its open or load/unload position, as shown in FIG. 3. In this position, the active end 83 of spring-loaded plunger 81 rides up inclined surface 86 and snaps into detent opening 85 under spring load to automatically lock the secondary test plate in place. In this load/unload position, the mounting face 25 of secondary test plate 7 faces the tester's station in front of test fixture 1, thereby allowing front loading of service portion 2 onto the secondary test plate by bolts 27. The convenience of this front loading position removes the physical strain on the tester heretofore encountered in having to mount the heavy and cumbersome service portion 23 in a side loading position.

With the service portion 23 bolted in place on secondary test plate 7, the handle of spring-loaded plunger 81 is raised to disengage the locking detent and allow secondary test plate 7 to be swung about hinge pin 43 into its test position, as shown in FIG. 4. In rotating second test plate 7 to this test position, it will be appreciated that extension spring 73 of spring assembly 45 maintains maximum extension of hinge assembly 9. This establishes a maximum rightward location of hinge pin 43 to assure engagement of face 32 at the outer side 89 of secondary test plate 7 with face 21 of primary test plate 5 prior to face 32 at the bifurcated side 33 making engagement. As this outer side 89 of secondary test plate 7 approaches engagement with face 21 of primary test plate 5 through the intermediary of gasket 30, roller 91 is brought to rest on flat 93 to establish proper vertical alignment with primary test plate 5.

Following this initial positioning, a clamp (not shown) which may be similar to that shown and described in U.S. Pat. No. 3,596,500 is activated to exert a force on the service portion in a left hand direction. As this clamping force is applied, the force at the hinge end of secondary test plate 7 is transmitted through connecting rods 69 to end plate 61 of spring assembly 45. In that end plate 61 is free to move leftwardly out of engagement with the side of end plates 47 and 49, due to expansion of spring 73, it will be seen that hinge joint 9 is deflected leftwardly to allow the secondary test plate to be brought into mating engagement with primary test plate 5 by the applied clamping force in this manner, secondary test plate is free to align itself face-to-face with primary test plate so that the integrity of the pressure seal provided by gasket 30 between the mating faces of the primary and secondary test plates is assured. Having required test procedure can be carried out, such test procedure being conducted in a well-known manner either manually or automatically in accordance with the "code of tests" specified by the Association of American Railroads for the particular air brake valve to be tested.

Following completion of the forgoing test procedure, the applied clamping force is removed and secondary test plate 7 including service portion 23 is rotated from the test position, shown in FIG. 4, back to the load/unload position, as shown in FIG. 3. With the clamping force removed, spring 73 is able to retract, thereby pulling end plate 61 back toward engagement with the side of hinge plates 47 and 49, which in turn extends hinge assembly 9. Spring-loaded plunger end 83 is thus aligned to engage detent opening 85 in the load/unload position, thereby locking the hinge assembly in place. In this load/unload position, the service portion 23 is conveniently located facing the front of the test station to facilitate removal of the tested valve preparatory to loading another valve for testing.

We claim:

1. For use with an air brake valve test rack, a test fixture comprising:
   a) a test stand including a valve mounting manifold to which fluid under pressure is connected;
   b) a primary test plate affixed at one face thereof to said valve mounting manifold, said one face having a plurality of inlet ports to certain ones of which fluid under pressure is connected from said manifold and another face having a plurality of outlet ports to certain ones of which fluid under pressure is connected from said certain ones of said inlet ports;
   c) a secondary test plate having a plurality of inlet ports in one face thereof corresponding to said plurality of outlet ports in said other face of said primary test plate, and a plurality of outlet ports in another face of said secondary test plate on which a valve device may be mounted for testing; and
   d) means for pivotally supporting said secondary test plate so as to provide rotation thereof between a test position in which said one face of said secondary test plate is engaged with said other face of said primary test plate and a load/unload position in which said one face of said secondary test plate is disengaged from said other face of said primary test plate.

2. A test fixture as recited in claim 1, wherein said means for pivotally supporting said secondary test plate comprises a hinge assembly between said secondary test plate and said test fixture.

3. A test fixture as recited in claim 2, wherein said hinge assembly comprises:
   a) a hinge joint affixed to one side of said secondary test plate;
   b) a hinge plate affixed to said one of said test stand and said primary test plate; and
   c) means for yieldably connecting said hinge joint to said hinge plate.

4. A test fixture as recited in claim 3, wherein said hinge joint comprises:
   a) a female portion integral with said secondary test plate and forming a bifurcation at one side thereof;
   b) a male portion extending into said bifurcation; and
   c) a hinge pin rotatably disposed in aligned openings in said male and female portions.

5. A test fixture as recited in claim 4 wherein said yieldable connecting means comprises:
   a) at least one connecting rod affixed at one end to said male portion of said hinge joint;
   b) at least one bore in said hinge plate in which said at least one connecting rod is slidably disposed, the other end of said at least one connecting rod projecting from said at least one bore;
   c) a first end plate connected to said projecting other end of said at least one connecting rod; and
   d) spring means acting on said end plate in a first direction to displace said hinge joint from said hinge plate, said spring means being yieldable in a direction opposite said first direction to provide said parallel alignment between said other face of said primary test plate and said one face of said secondary test plate in said test position thereof.

6. A test fixture as recited in claim 5, further characterized in that said hinge plate provides a stop with which said first end plate is engageable to limit said displacement of said hinge joint in said first direction.

7. A test fixture as recited in claim 6, wherein said at least one bore comprises a pair of bores, and said at least one connecting rod comprises a pair of connecting rods each disposed in a respective one of said pair of bores, said first end plate being connected to said projecting other ends of said pair of connecting rods, and said spring means acting on said first end plate substantially midway between said connections of said pair of connecting rods therewith.

8. A test fixture as recited in claim 7, wherein said hinge assembly further comprises a second end plate disposed between said hinge plate and said hinge joint, said second end plate having first and second openings through which said first and second connecting rods pass said spring means being an extension spring interconnected to said first and second end plates, said connection of said extension spring to said second end plate being at a location substantially midway between said first and second openings therein.

9. A test fixture as recited in claim 4, further comprising means for locking said secondary test plate against rotation in said load/unload position.

10. A test fixture as recited in claim 9, wherein said locking means comprises:
    a) a spring loaded plunger mounted on said female portion of said secondary test plate and extending into said bifurcation thereof;
    b) a detent opening in said male portion of said hinge joint axially aligned with said plunger in said test position of said secondary test plate; and
    c) an inclined surface of said male portion contiguous with said detent opening, said inclined surface covering an area described by the arc of said plunger during rotation of said secondary test plate between said test and said load/unload positions.

11. A test fixture as recited in claim 1, further comprising means for supporting said secondary test plate at the side thereof opposite said one side to which said hinge joint is affixed.

12. A test fixture as recited in claim 11, wherein said supporting means comprises:
    a) a carriage member fixed to said opposite side of said secondary test plate; and
    b) a roller carried by said carriage member and adapted to rest on a vertically bearing surface.

* * * * *